United States Patent [19]

Yasuhara et al.

[11] Patent Number: 5,442,378
[45] Date of Patent: Aug. 15, 1995

[54] ANIMATION IMAGE CONSTRUCTING APPARATUS

[75] Inventors: Hiroshi Yasuhara, Tokyo; Hiroko Kusano, Kanagawa; Nae Yasuhara, Tokyo; Miyuki Marusawa, Kanagawa, all of Japan

[73] Assignee: Sony Corporation, Tokyo, Japan

[21] Appl. No.: 44,553

[22] Filed: Apr. 7, 1993

Related U.S. Application Data

[63] Continuation of Ser. No. 755,329, Sep. 5, 1991, abandoned.

[30] Foreign Application Priority Data

Sep. 10, 1990 [JP] Japan ................... 2-239280

[51] Int. Cl.⁶ ............................................. B01G 3/02
[52] U.S. Cl. ................... 345/168; 345/123
[58] Field of Search ............ 340/724, 725, 709, 706; 395/152; 345/168, 169, 170, 173, 161, 156, 121, 122, 123; 273/148 B; 341/22

[56] References Cited

U.S. PATENT DOCUMENTS

| | | | |
|---|---|---|---|
| 4,202,041 | 5/1980 | Kaplow et al. | 345/168 |
| 4,686,522 | 8/1987 | Hernandez et al. | 340/709 |
| 4,754,269 | 6/1988 | Kishi et al. | 395/127 |
| 5,090,909 | 2/1992 | Kellar et al. | 340/725 |
| 5,095,303 | 3/1992 | Clark et al. | 340/709 |
| 5,111,426 | 5/1992 | Bergstresser, Sr. et al. | 395/800 |

FOREIGN PATENT DOCUMENTS 0247827  12/1987  European Pat. Off. .

*Primary Examiner*—Ulysses Weldon
*Assistant Examiner*—Doon Chow
*Attorney, Agent, or Firm*—Philip M. Shaw, Jr.; Limbach & Limbach

[57] ABSTRACT

An animation image construction apparatus for producing animated pictures on a CRT screen of a display unit in a television receiver, wherein a desired scroll direction can be designated with respect to each of individual characters displayed on the screen, so that an expressive motion can be given to any picture drawn on the screen to consequently ensure remarkable visual effects and pleasure for the user. Furthermore, the front and rear positional relation between the displayed characters to be mutually superimposed can be designated in the scroll mode, whereby the pictures produced on the screen are so processed as to have a visual depth in addition to the expressive motion with the visual effects and pleasure offered to the user.

10 Claims, 17 Drawing Sheets

F I G. 4

| MEMORY AREA | PATTERN No. | X | Y | COLOR | SCROLL CODE | ANIMATION CELL No. |
|---|---|---|---|---|---|---|
| 1 | 1 | 100 | 100 | 2 | 3 | 0 |
| ⋮ | ⋮ | ⋮ | ⋮ | ⋮ | ⋮ | ⋮ |
| 100 | 1 | 100 | 80 | 1 | 3 | 0 |

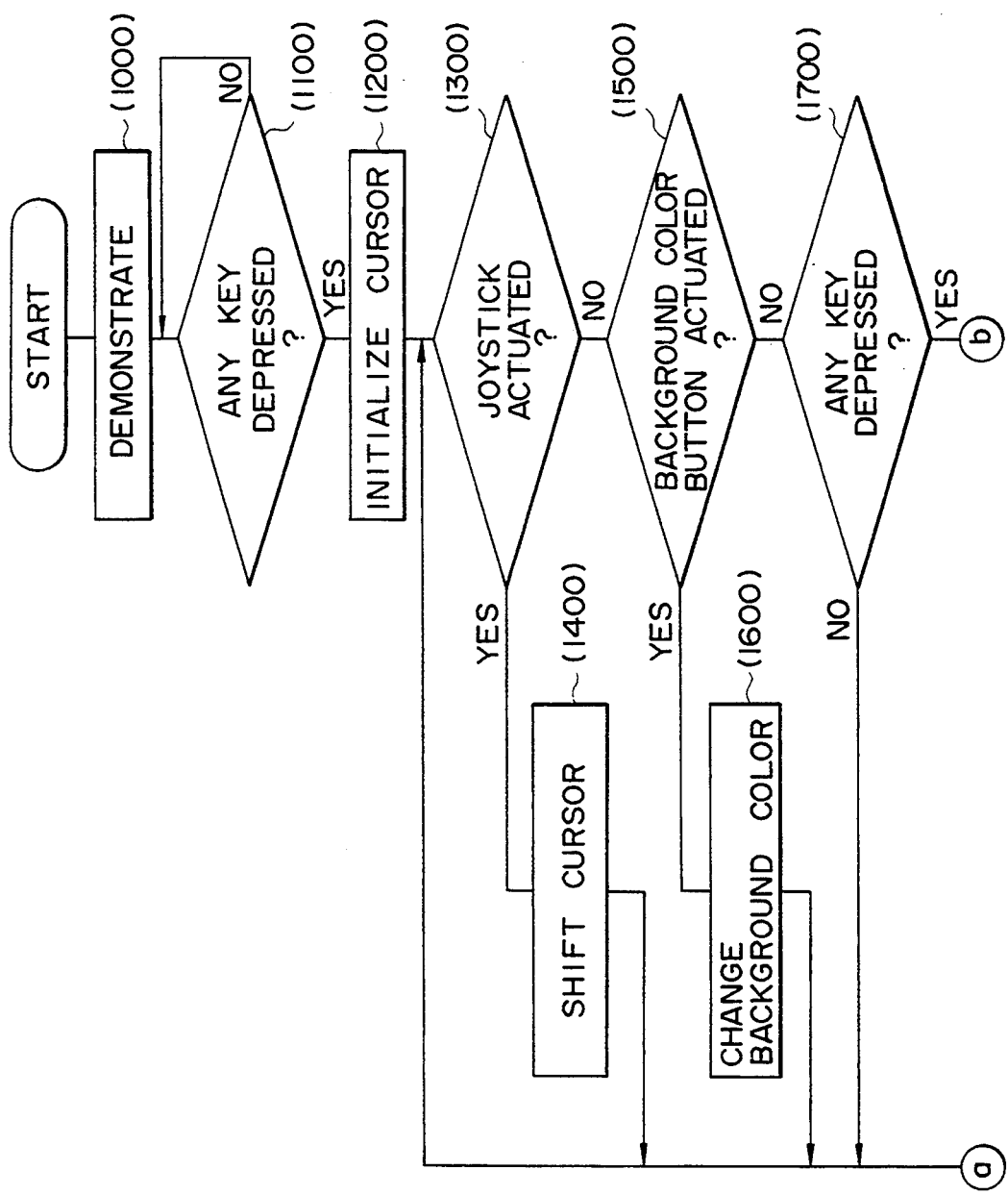
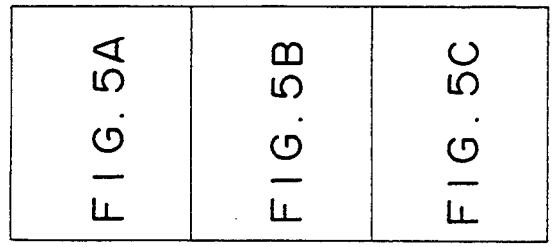

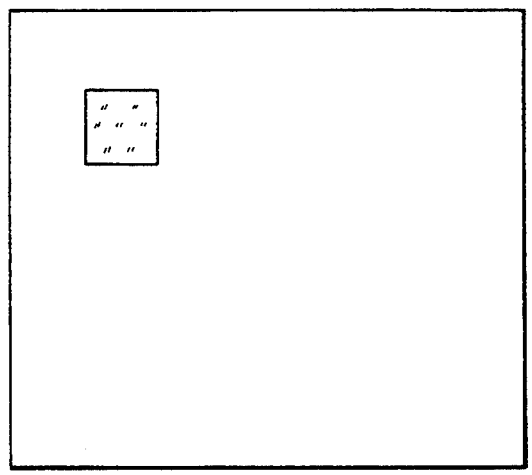
F I G. 6D
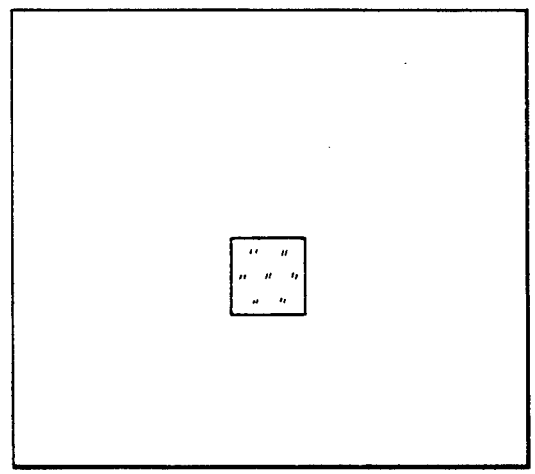
F I G. 6E
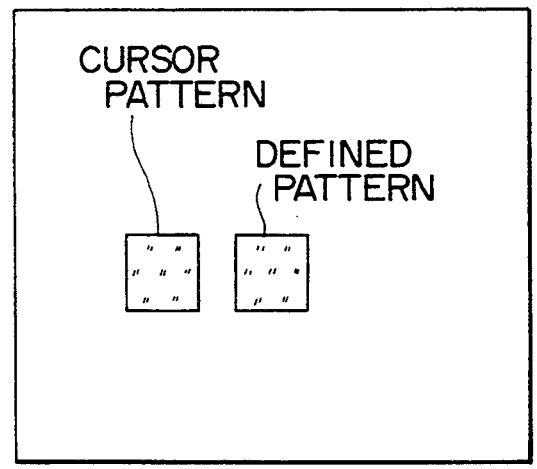
F I G. 6F

FIG. 7A
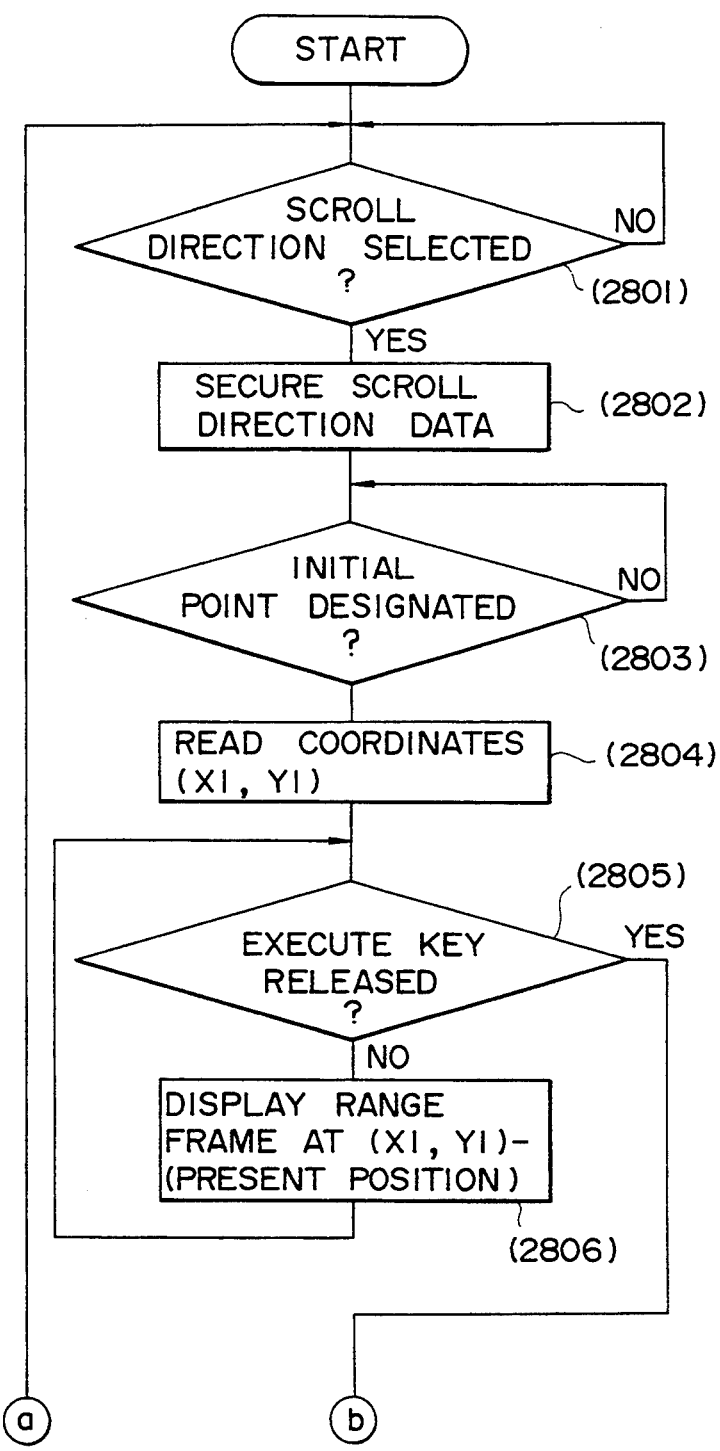
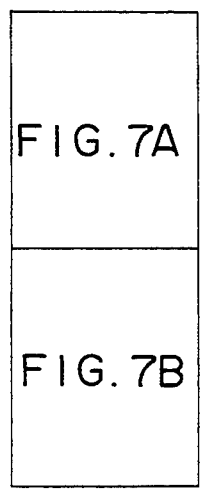

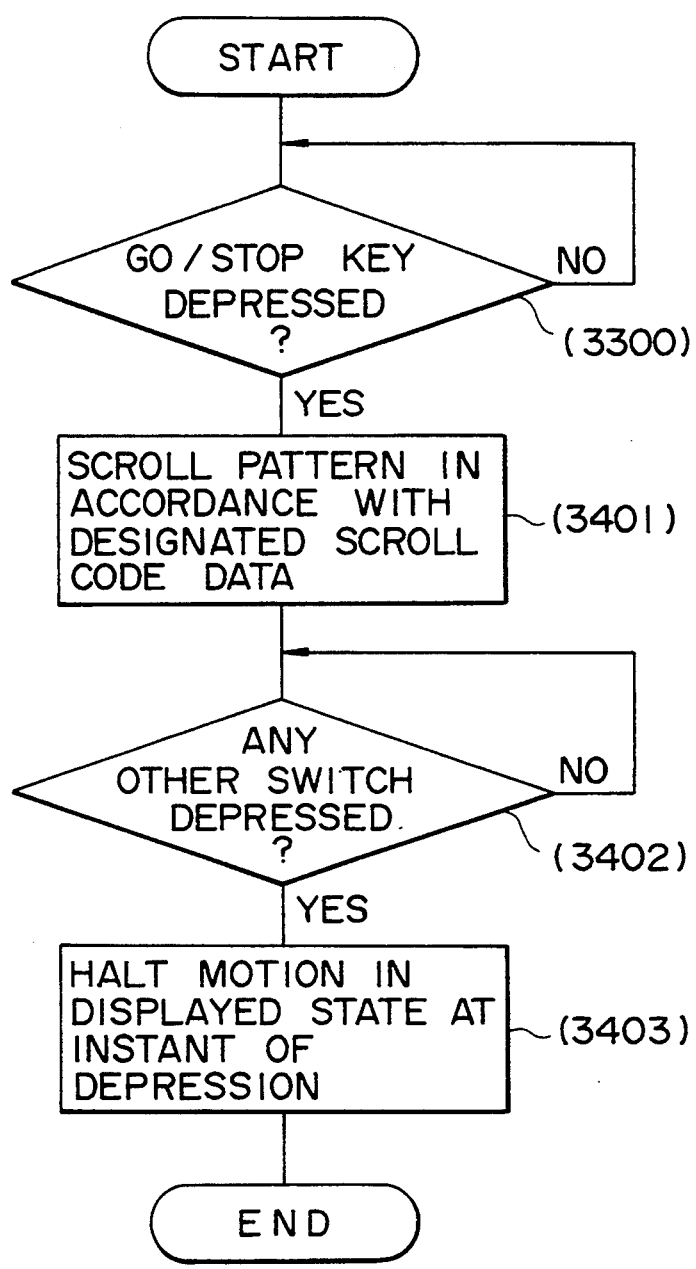

ANIMATION IMAGE CONSTRUCTING APPARATUS

This is a continuation application of application Ser. No. 07/755,329 filed on Sep. 5, 1991, now abandoned.

BACKGROUND OF THE INVENTION

1. Field of the Invention

The present invention relates to an animation drawing apparatus for producing animated pictures on a monitor screen of a television receiver or the like.

2. Description of the Prior Art

There has been known heretofore an animation image constructing system contrived to produce animated pictures on a monitor screen of a television receiver. Such animation drawing system includes an apparatus equipped with a tablet and key groups, wherein a plurality of characters of the same size (e.g., 16×16 dots) are displayed on a CRT (cathode-ray tube) screen of a monitor, and when a desired one of such characters is selected by depression of a select key or the like by a user, a cursor indicates the selected character. In case the desired character is not existent in any of the characters displayed on the monitor screen, some more characters are displayed on the monitor screen by the user, and then the desired character can be selected out of such newly displayed characters by depression of the select key. Furthermore the color of the selected character is also selectable by a color select key or the like so that the character color is rendered changeable on the screen.

And when the user designates a desired cursor position on the monitor screen by means of an exclusive pen on the tablet corresponding to the monitor screen, the cursor is shifted to the desired position on the monitor screen. And if a position set key is depressed in this stage, the character indicated by the cursor can be defined at such desired position.

The pictures produced by repeating the above operation can be scrolled on the screen by depressing a scroll key. It is possible to designate the scroll direction to be upward or downward by the scroll key so that the entire pictures thus obtained are scrolled in the same direction.

In the conventional animation drawing system, a group of some characters are sequentially displayed on the monitor screen, and a desired character selected out of the displayed character group is indicated by a cursor. And after designation of the cursor position by the tablet, the cursor-indicated character is defined at the designated position so that a picture is produced on the monitor screen, and subsequently the entire pictures are scrolled upward or downward by depressing the scroll key.

Thus, as obvious from the above, the operation is so performed in the conventional animation drawing apparatus that the entire pictures are merely scrolled upward or downward to consequently bring about some disadvantages including insufficiency of visual expression, effect and pleasure.

OBJECTS AND SUMMARY OF THE INVENTION

It is an object of the present invention to provide an improved animation image constructing apparatus equipped with remarkable functions for realizing expressive motions in animated pictures drawn on a monitor screen of a television receiver, enabling a user to enjoy visual effects and pleasure, and giving visual depth to each picture produced on the screen.

Another object of the present invention is to provide an improved animation image constructing apparatus where characters displayed on a monitor screen can be scrolled individually in any of predetermined directions by designation.

And a further object of the present invention resides in providing an improved animation image constructing apparatus where the front and rear positional relation of characters displayed on a monitor screen can be selectively designated at the time of scroll.

According to one aspect of the present invention, there is provided an animation image constructing apparatus comprising: means for drawing a plurality of characters on the monitor screen of a display unit; means for selectively designating a desired character out of those on the screen of the display unit; means for designating scroll direction data for scrolling the designated character in a predetermined direction; and means for generating an execution command; wherein, in response to the execution command, the designated character is scrolled in accordance with the scroll direction data.

According to another aspect of the present invention, there is provided an animation image constructing apparatus further including means for designating the priority order between the characters drawn on the display screen, wherein, when the characters being displayed are scrolled so as to be mutually superimposed, one of such characters is displayed with priority in accordance with the designated priority order.

The above and other features and advantages of the present invention will become apparent from the following description which will be given with reference to the illustrative accompanying drawings.

BRIEF DESCRIPTION OF THE DRAWINGS

FIG. 4 schematically illustrates an exemplary operation for explaining the animation image construction apparatus of the present invention;

FIGS. 5 and 5A–5C are flow charts of the operating procedure executed in the animation image construction apparatus;

FIGS. 6A through 6I illustrate exemplary operational processes in the animation image construction apparatus of the present invention;

FIGS. 7 and 7A–7B are flow charts of the operation for scroll designation in the animation image construction apparatus of the present invention;

FIG. 8 is a flow chart of the operating procedure executed in the animation image construction apparatus of the present invention;

DESCRIPTION OF THE PREFERRED EMBODIMENTS

Hereinafter an exemplary animation image construction apparatus of the present invention will be described in detail with reference to FIG. 1.

Figure 1:
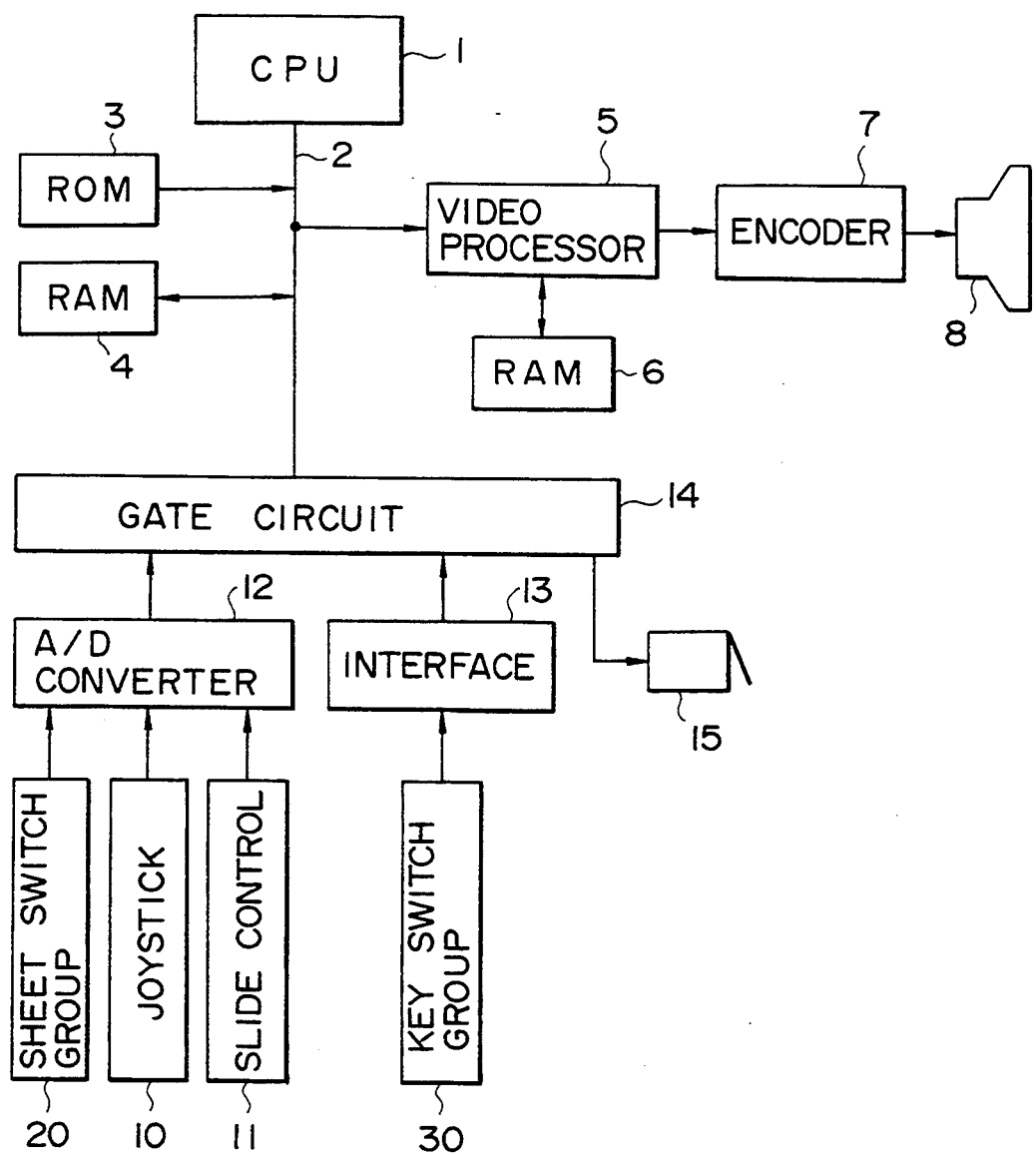
FIG. 1 is a block diagram of an animation image construction apparatus embodying the present invention.

In FIG. 1, there are included a CPU (central processing unit) 1, a bus (comprising address bus, control bus and data bus) 2; a ROM (read only memory) 3 for storing a program and character patterns; a RAM (random access memory) 4 for storing data and so forth; and a video processor 5 for sequentially reading out the stored video data from a RAM 6 via the bus 2. The video data signal thus read is supplied to an encoder 7 (e.g., NTSC encoder). The encoder 7 converts the output video data signal of the video processor 5 to a color video signal of the NTSC format, which is then supplied to a monitor 8 so that the video data is displayed on a CRT screen of the monitor 8. Denoted by 20 is the below mentioned sheet switch group which comprises keys for designating character patterns to be displayed on the screen of the monitor 8, and keys for designating desired colors of character patterns. If any one key of such sheet switch group 20 is depressed, an analog data signal outputted by such depression of the sheet switch group 20 is converted into a digital data signal by an A-D (analog-to-digital) converter 12 and then is supplied to the CPU 1 via a gate circuit 14 and the bus 2. Denoted by 10 is a joystick with potentiometers disposed orthogonally to output an analog position data signal. The analog position signal from the joystick 10 is converted into a digital position signal by the A-D converter 12 and then is supplied to the CPU 2 via the gate circuit 14 and the bus 2. Also shown is a slide control 11 which is slid to output an analog background color signal for changing the background color of the screen. This signal is converted into a digital background color signal by the A-D converter 12 and then is supplied to the CPU 1 via the gate circuit 14 and the bus 2. There is further shown a key switch group 30 including a clear key 31, an undo key 32, an execute key 33, front/rear designate keys 34f and 34r, an erase key 35, a go/stop key 36, and a scroll key 37 (shown in FIG. 2). A command signal outputted by depressing any of such key switch group 30 is supplied to the CPU 1 via an interface 13 and the bus 2. Denoted by 15 is a buzzer for emitting a sound in response to a signal corresponding to the switch depression data or the command data supplied from the CPU 1 via the gate circuit 14, or in response to a signal corresponding to the position data obtained when the pattern is moved on the monitor screen by manipulating the joystick 10.

Figure 2:
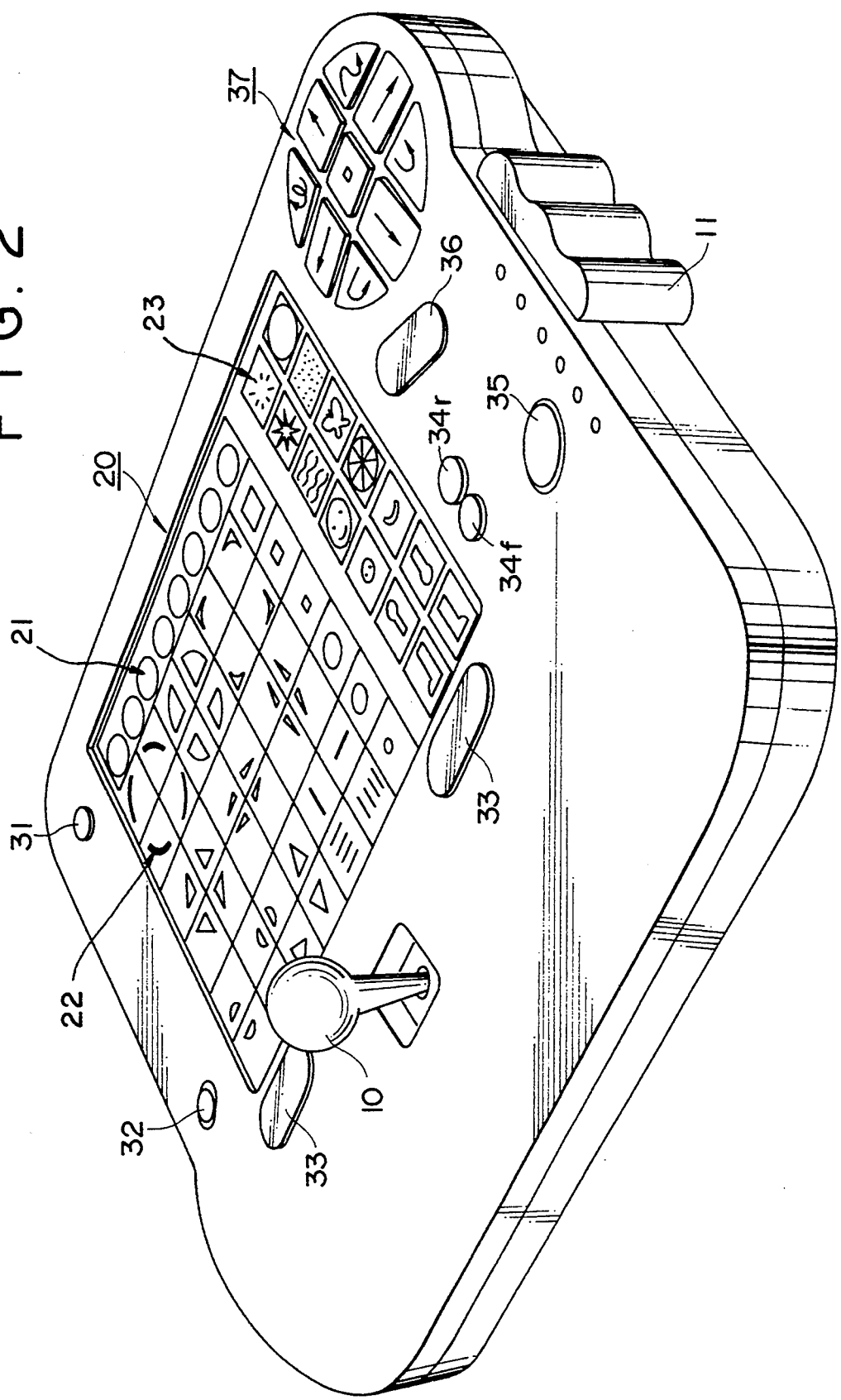
FIG. 2 is a perspective view of the animation image construction apparatus according to the present invention.
Figure 3:
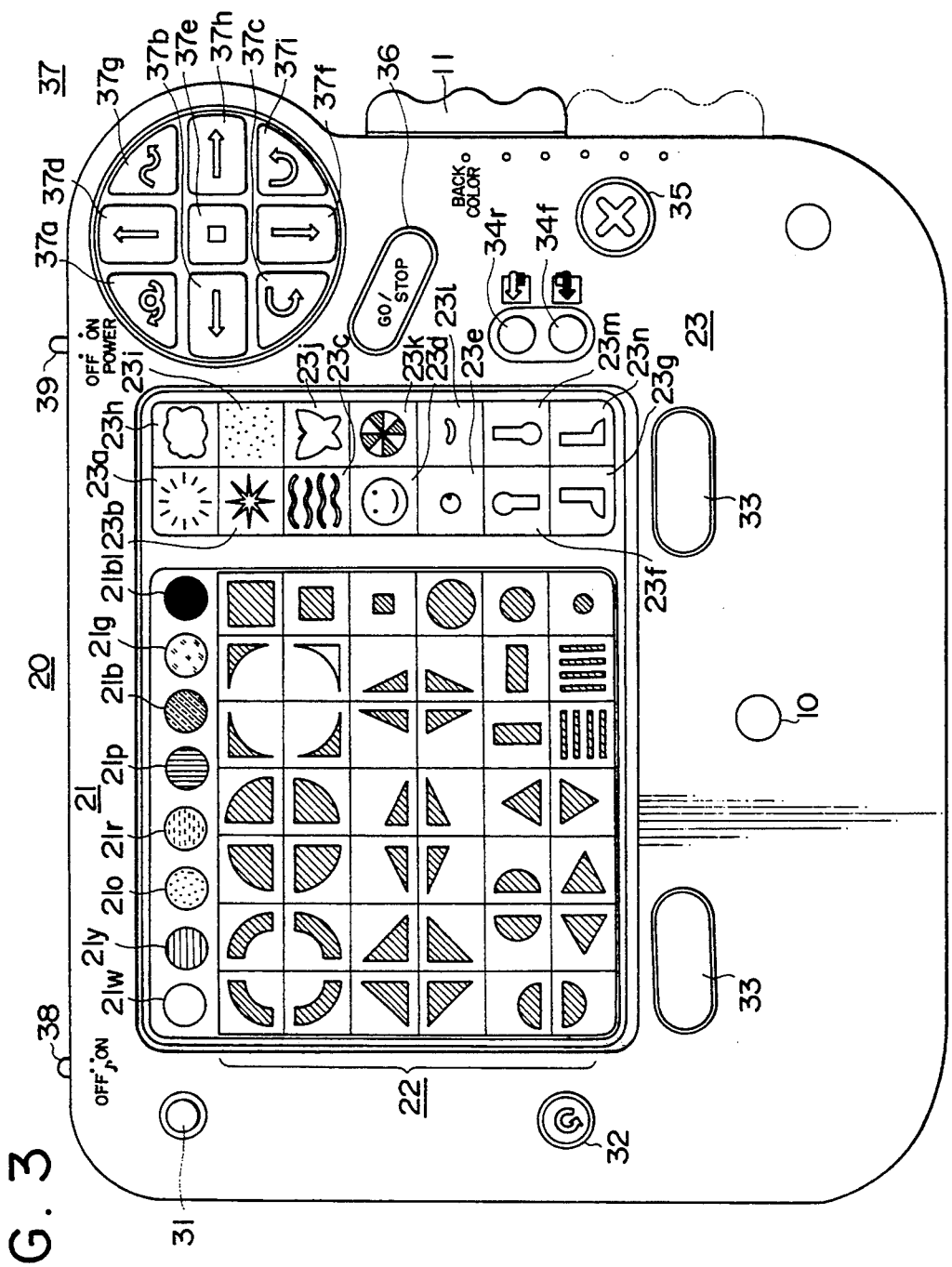
FIG. 3 is a plan view of an exemplary control panel in the animation image construction apparatus of the present invention.

FIG. 2 is a perspective view of the animation image construction apparatus according to the present invention. In FIG. 2, the sheet switch group 20 comprises abstract pattern keys 22, color designate keys 21 and concrete pattern keys 23 which are also shown in FIG. 3. Each of the color designate keys 21 is used for designating the color of the pattern displayed on the screen by the abstract, geometric pattern key 22 or the concrete, semirealistic pattern key 23 which will be described later. The color designate keys 21 consist of a white key 21w, a yellow key 21y, an orange key 21o, a red key 21r, a purple key 21p, a blue key 21b, a green key 21g, and a black key 21bl. The portions of such keys 21w, 21y, 21o, 21r, 21p, 21b, 21g and 21bl to be depressed are colored individually in white, yellow, orange, red, purple, blue, green and black as illustrated, thereby enabling the user to immediately grasp which of the keys corresponds to which of the colors. As illustrated, the abstract pattern keys 22 consist of 42 different keys for example, which are so arranged that the abstract pattern depicted on any key is displayed on the screen when such key is depressed. The concrete pattern keys 23 consist of 14 different keys 23a, 23b, ... 23m where concrete patterns are depicted individually as illustrated. When any of such concrete pattern keys is depressed, the concrete pattern depicted thereon is displayed on the screen. The clear key 31 is used for clearing the pattern displayed on the screen, the undo key 32 for resuming the former state anterior to a certain command, and the execute key 33 for defining the position of the pattern selected by the abstract pattern key 22 or the concrete pattern key 23. The front/rear designate keys 34f and 34r are used for designating the front and rear positional relation of patterns, the erase key 35 for erasing the displayed pattern, the go/stop key 36 for moving or stopping the pattern, and the scroll key 37 for scrolling the pattern. The scroll key 37 consists of 8 different keys 37a, 37b, ... 37i with scroll states depicted thereon individually as illustrated in FIG. 3. And any pattern selected by the abstract pattern key 22 or the concrete pattern key 23 is scrolled on the screen of the monitor 8 with the motion depicted on the scroll key 37a, 37b, ... or 37i.

Further shown are a buzzer switch 38 for selectively switching on or off the buzzer 15, and a power switch 39.

Now the operation of CPU 1 of the animation image construction apparatus according to the present invention will be described below with reference to a flow chart of FIG. 5.

First, when the power switch 39 is turned on, a demonstration is performed in step 1000. In the demonstration, pictures composed of abstract and concrete patterns are scrolled or moved on the screen of the monitor 8 in accordance with a demonstration pattern program stored previously in the ROM 3. Then the operation proceeds to next step 1100.

In step 1100, a decision is made as to whether any key (FIG. 2 or 3) has been depressed or not. The operation proceeds to step 1200 if the result of such decision is "YES", or to step 1100 again in case the result is "NO".

Figure 6A:
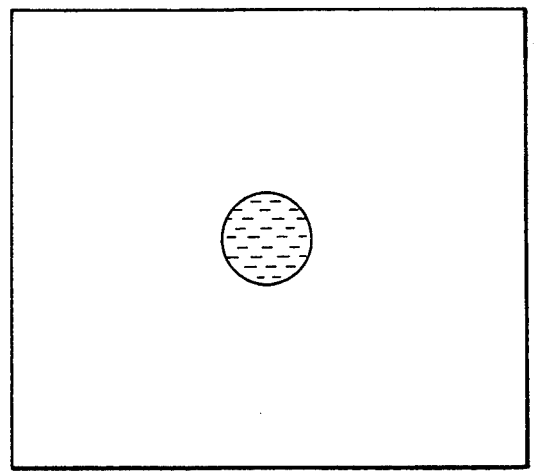

The cursor is initialized in step 1200. Initialization of the cursor is so performed as shown in FIG. 4 to store, in the memory areas of the RAM 4, pattern numbers representing predetermined absolute patterns (e.g., circle), positions X and Y (coordinates along the abscissa and ordinate on the monitor screen), and color data in accordance with the program stored previously in the ROM 3. And the predetermined patterns of predetermined colors are stored, via the bus 2, in accordance with the data in the memory area of the RAM 4, at predetermined positions in the RAM 6 corresponding to the screen of the monitor 8. Then the data is read out from the RAM 6 by the video processor 5, and the video data thus read out is supplied to the monitor 8 via the encoder 7 (e.g., NTSC encoder). Therefore, on the screen of the monitor 8, a red circular abstract pattern, for example, is displayed with a cursor as shown in FIG. 6A. And then the operation proceeds to step 1300.

In step 1300, a decision is made as to whether the joystick 10 has been actuated or not. And the operation proceeds to step 1400 if the result of such decision is "YES", or to step 1500 in case the result is "NO".

In step 1400, the position data X, Y in the memory area of the RAM 4 shown in FIG. 4 is changed in accordance with the digital position signal supplied from the joystick 10 via the A-D converter 12, the gate circuit 14 and the bus 2, and further the pattern stored in the ROM 3 correspondingly to the pattern number is stored, with the color data conforming to the color number, in the RAM 6 at the position (address) represented by the position data X, Y. As shown in FIG. 4, such memory areas are so arranged that the data are sequentially loaded into the CPU 1 downward from the top in the diagram, i.e., from the smallest address in the memory area of the RAM 4. It follows therefore that the pattern data are sequentially stored in the RAM 6 in the above order.

Figure 6B:
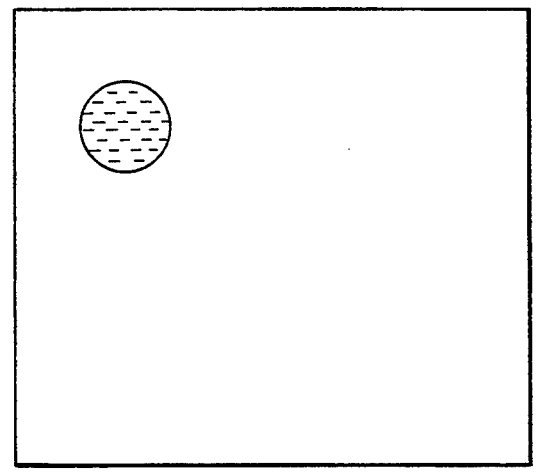

The video data is read out from the RAM 6 by the video processor 5 and then is supplied via the encoder 7 to the monitor 8, so that the abstract pattern indicated by the cursor as shown in FIG. 6B is displayed at the position illustrated. And the operation returns to step 1300 again.

In step 1500, a decision is made as to whether the background color button (slide control) 11 has been actuated or not, and the operation proceeds to step 1600 if the result of such decision is "YES", or to step 1700 in case the result is "NO".

In step 1600, any portion other than the patterns on the screen of the monitor 8 is changed to the designated background color. More specifically, the data of the designated color is stored in the address area of the RAM 6 corresponding to the background. And then the operation returns to step 1300 again.

In step 1700, a decision is made as to whether any key has been depressed or not. And the operation proceeds to step 1800 if the result of such decision is "YES", or to step 1300 again in case the result is "NO". Depression of any key ceases the motion of the concrete pattern depicted on the below mentioned concrete pattern key 23 or to cease the scroll of both the abstract and concrete patterns on the screen of the monitor 8.

In step 1800, a decision is made as to whether there exists any motion of the concrete pattern or any scroll of the concrete and abstract patterns. And the operation proceeds to step 1900 if the result of such decision is "YES", or to step 2000 in case the result is "NO".

In step 1900, any motion of the concrete pattern or any scroll of the concrete and abstract patterns is brought to a halt. And then the operation proceeds to step 2000.

In step 2000, a decision is made as to whether the execute key 33 has been depressed or not. And the operation proceeds to step 2100 if the result of such decision is "YES", or to step 2200 in case the result is "NO".

In step 2100, a process is executed in such a manner that, when the cursor is in the shape of a pattern, the cursor-indicated pattern is set at the position of the cursor. More specifically, the position X, Y is defined in the RAM 4 as shown in FIG. 4, whereby one memory area is defined. And the operation returns to step 1300 again.

In step 2200, a decision is made as to whether the color designate key 21 has been depressed or not. And the operation proceeds to step 2300 if the result of such decision is "YES", or to step 2400 in case the result is "NO".

Figure 6C:
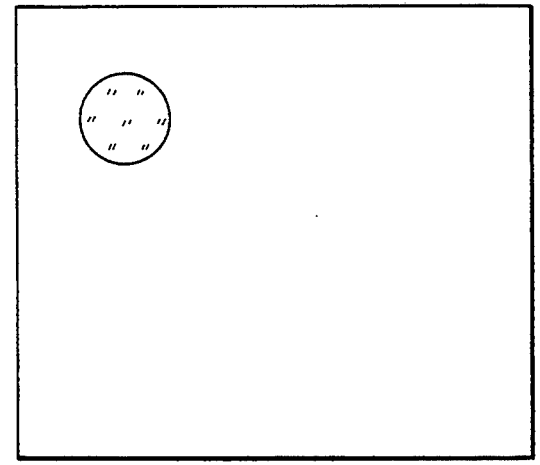

In step 2300, the color of the cursor is changed. More specifically, as shown in FIG. 4, the color data stored in the memory area of the RAM 4 is changed to the color data which represents the color designated by the color designate key 21, whereby the pattern in the above-described memory area is stored in the RAM 6 with the color data stored in the RAM 4. Subsequently the video data stored in the RAM 6 is read out therefrom by the video processor 5 and then is supplied via the encoder 7 to the monitor 8, so that the pattern indicated by the cursor is displayed on the screen of the monitor 8 in the color designated by the color designate key 21. When the color designate key 21g is depressed for example, the abstract pattern is changed to green as shown in FIG. 6C. And the operation returns to step 1300 again.

In step 2400, a decision is made as to whether any abstract key 22 has been depressed or not. And the operation proceeds to step 2500 if the result of such decision is "YES", or to step 2600 in case the result is "NO".

Figure 6G:
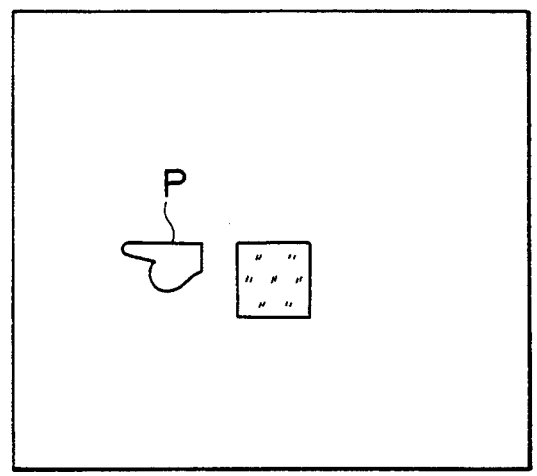

In step 2500, the shape of the cursor is changed. More specifically, the data representing the pattern number in the memory area of the RAM 4 as shown in FIG. 4 is changed to the pattern number data corresponding to the pattern designated by the depressed abstract pattern key 22. Consequently the pattern data corresponding to the pattern number data stored in the RAM 4 is read out from the ROM 3 and then is stored in the RAM 6 in accordance with the data in the above-described memory area. Subsequently the video data stored in the RAM 6 is read out therefrom by the video processor 5 and then is supplied via the encoder 7 to the monitor 8, whereby the cursor-indicated pattern is displayed on the screen of the monitor 8 with the pattern designated by the abstract pattern key 22. For example, when the abstract pattern key 22 having a depiction of a square is depressed, the round cursor is changed to a square one as shown in FIG. 6G. And the operation returns to step 1300 again.

In step 2600, a decision is made as to whether any concrete pattern key 23 has been depressed or not. And the operation proceeds to step 2500 if the result of such decision is "YES", or to step 2700 in case the result is "NO".

In step 2500, the shape of the cursor is changed. More specifically, the data representing the pattern number in the memory area of the RAM 4 as shown in FIG. 4 is changed to the pattern number data corresponding to the pattern designated by the depressed concrete pattern key 23. Consequently the pattern data corresponding to the pattern number data stored in the RAM 4 is read out from the ROM 3 and then is stored in the RAM 6 in accordance with the data in the above-described memory area. Subsequently the video data stored in the RAM 6 is read out therefrom by the video processor 5 and then is supplied via the encoder 7 to the monitor 8, whereby the cursor-indicated pattern is displayed on the screen of the monitor 8 with the pattern designated by the depressed concrete pattern key 23. And the operation returns to step 1300 again. Thereafter, if the abstract pattern is moved by the joystick 10 to the position of FIG. 6E for example and the execute key 33 is depressed in step 2000, the position, color and shape of the pattern are defined as shown in FIG. 6F while the cursor remains unchanged in the same pattern.

In step 2700, a decision is made as to whether the erase key 35 has been depressed or not. And the operation proceeds to step 2800 if the result of such decision is "YES", or to step 2900 in case the result is "NO". The erase key 35 is used for erasing any pattern on the screen by a hand-shaped range pointer P which will be mentioned later, or for erasing the entire pattern data in the memory area shown in FIG. 4.

Figure 6H:
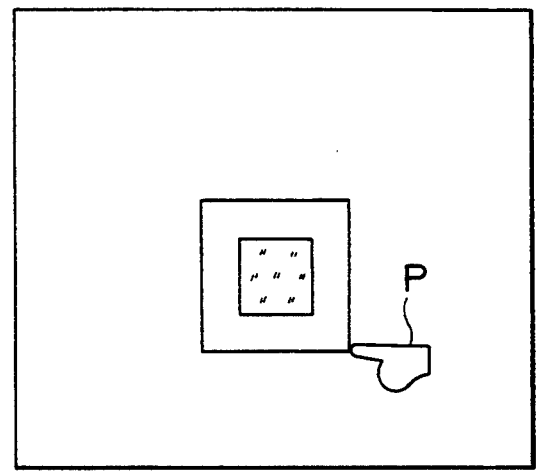

In step 2800, the shape of the cursor is changed to the hand-shaped range pointer P shown in FIG. 6H. And the operation returns to step 1300 again.

In step 2900, a decision is made as to whether the front/rear designate key 34f or 34r has been depressed or not. And the operation proceeds to step 2800 if the result of such decision is "YES", or to step 3000 in case the result is "NO".

In step 3000, a decision is made as to whether the scroll key 37 has been depressed or not. And the operation proceeds to step 2800, if the result of such decision is "YES", for changing the shape of the cursor to the range pointer P, or to step 3100 in case the result is "NO".

In step 3100, a decision is made as to whether the clear key 31 has been depressed or not. And the operation proceeds to step 3200 for clearing the pattern if the result of such decision is "YES", or to step 3300 in case the result is "NO".

In step 3300, a decision is made as to whether the go/stop key 36 has been depressed or not. And the operation proceeds to step 3400 if the result of such decision is "YES", or to step 1300 again if the result is "NO".

Figure 6I:
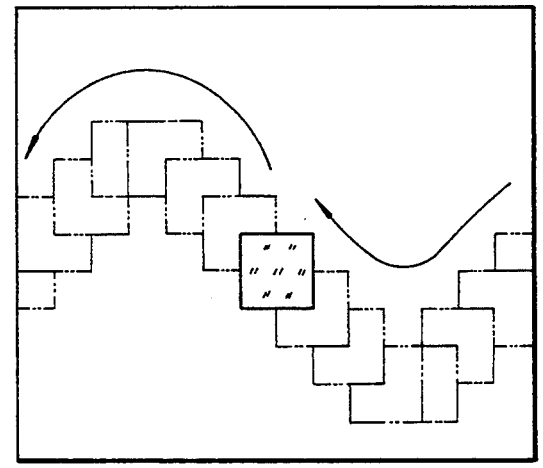

In step 3400, motion of the concrete pattern or scroll of the abstract and concrete patterns is started. Relative to the scroll for example, the abstract and concrete patterns designated by the range pointer P after determination of the position are scrolled on the screen of the monitor 8 as indicated by arrows which are depicted on the individual scroll keys 37a, 37b, . . . 37i constituting the scroll key group 37. For such scroll, the data of the scroll code stored in the memory area of the RAM 4 as shown in FIG. 4 can be rewritten by the depressed scroll key 37, so that the position data X, Y are sequentially changed at a predetermined rate, and the video data are written in the RAM 6 sequentially in accordance with the changed data in the memory area of the RAM 4. Such written data are read out sequentially by the video processor 5 and then are supplied via the encoder 7 to the monitor 8, whereby the pattern is scrolled as illustrated in FIG. 6I.

In step 3400, if the go/stop key 36 or any other key is depressed after start of the scroll or motion of the concrete pattern, such scroll or motion of the concrete pattern is brought to a halt.

Figure 7B:
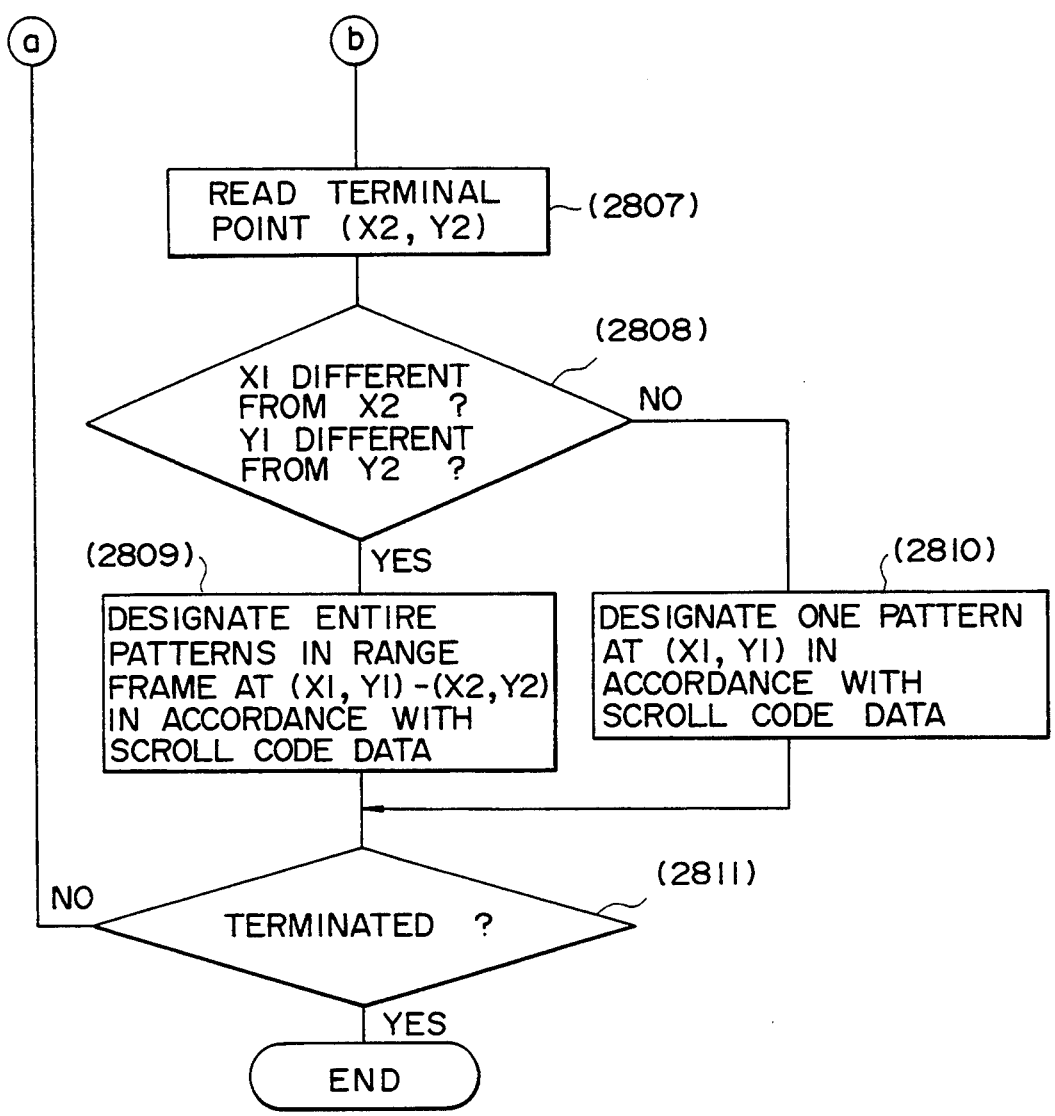

As described above with reference to the flow chart of FIG. 5, the operation proceeds to step 2800 when the scroll key 37 is depressed in step 3000, and the cursor is changed to the range pointer P so that the pattern or the pattern aggregate to be scrolled on the monitor screen is designated by the range pointer P, and thereafter the scroll is executed. Hereinafter a description will be given with reference to another flow chart of FIG. 7 on how to designate the scroll by the range pointer P.

First in step 2801, a decision is made as to whether the scroll direction has been selected or not. And the operation proceeds to step 2802 if the result of such decision is "YES", or to step 2801 again in case the result is "NO". The scroll direction (including the motion) is denoted by the arrow depicted on the depressible portion of each of the keys 37a, 37b, . . . 37i constituting the scroll key group 37.

In step 2802, the data of the scroll direction is secured. More specifically, the scroll data obtained from the depressed scroll key 37a, 37b, . . . 37h or 37i is stored in the RAM 4. And then the operation proceeds to step 2803.

Figure 9A:
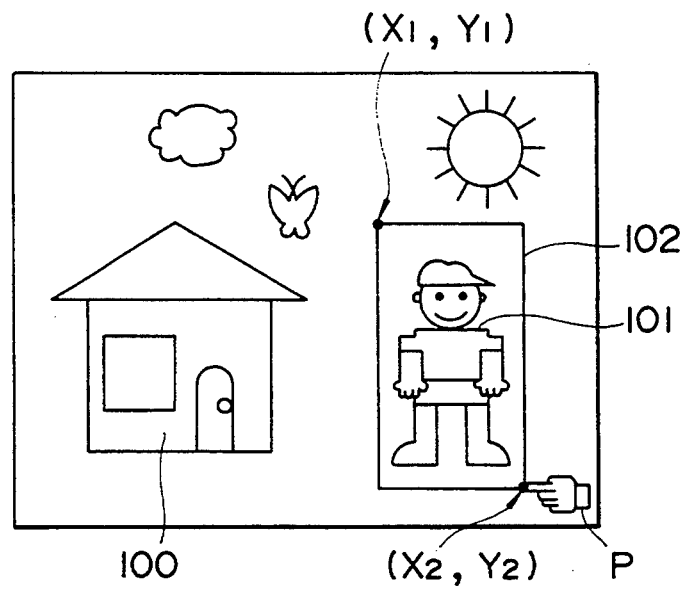
FIGS. 9 and 10 illustrate how the front and rear positional relation of pictures is designated at the time of scroll in the animation image construction apparatus of the present invention.
Figure 10A:
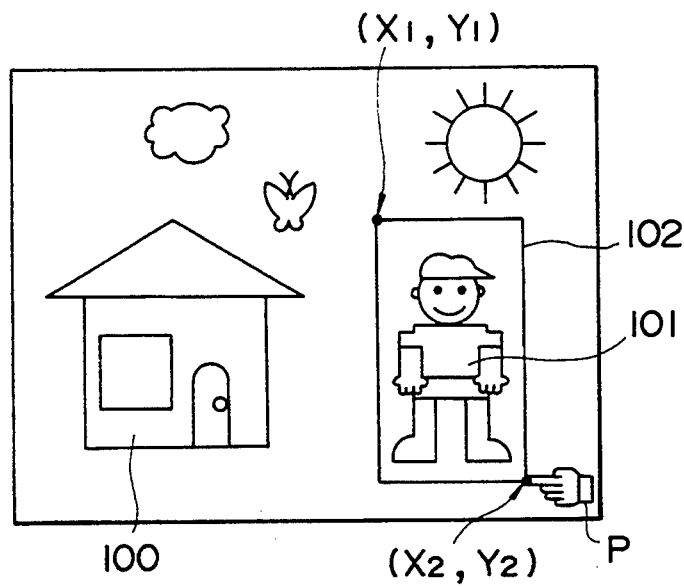

In step 2803, a decision is made as to whether the initial point has been designated or not. And the operation proceeds to step 2804 if the result of such decision is "YES", or to step 2803 again in case the result is "NO". Designation of the initial point is executed by first shifting the range pointer P, which is used as a cursor as illustrated in FIG. 9A or 10A, by means of the joystick 10 to a suitable position in the upper left region of the pattern or the pattern aggregate to be scrolled, and then depressing the execute key 33. The position (X1, Y1) at the instant of depressing the execute key 33 is determined as the initial point.

In step 2804, the position (X1, Y1) is read. More specifically, the initial point (X1, Y1) is derived from the digital position signal obtained by actuating the joystick 10, and such initial point (X1, Y1) is stored in the RAM 4. And then the operation proceeds to step 2805.

In step 2805, a decision is made as to whether the execute key 33 has been released or not. And the operation proceeds to step 2807 if the result of such decision is "YES", or to step 2806 in case the result is "NO".

In step 2806, a range frame 102 is displayed on the monitor screen as illustrated in FIG. 9A or 10A. The range frame 102 is displayed by first shifting the range pointer P to the initial point (X1, Y1) by means of the joystick 10, then depressing the execute key 33 continuously, and shifting the range pointer P by the joystick 10 to a suitable position in the lower right region of the pattern or the pattern aggregate to be scrolled, as illustrated in FIG. 9A or 10A. The range frame 102 signifies that the pattern or the pattern aggregate enclosed with such frame 102 is scrolled.

In step 2807, a terminal point is read. As illustrated in FIG. 9A or 10A, the range pointer P is shifted on the monitor screen by the joystick 10 while the execute key 33 is continuously depressed. Subsequently the pattern or the pattern aggregate (a boy 101 in the example of FIG. 9A or 10A) to be scrolled is enclosed with the range frame 102, and the execute key 33 is released at the terminal point (X2, Y2). Then the position (X2, Y2) of the range pointer P used as a cursor on the screen at the instant of releasing the execute key 33 is stored in the RAM 4. Thereafter the operation proceeds to step 2808.

In step 2808, a decision is made as to whether the value X1 of the initial point is different or not from the value X2 of the terminal point and also whether the value Y1 of the initial point is different or not from the value Y2 of the terminal point. And the operation proceeds to step 2809 if the result of such decision is "YES", or to step 2801 in case the result is "NO".

In step 2809, the range designated by the initial point (X1, Y1) and the terminal point (X2, Y2), i.e., the entire pattern (the boy 101 in this example) designated by the frame 102 as illustrated in FIG. 9A or 10A, is so processed that the scroll code data stored in the memory area of the RAM 4 correspondingly to such pattern is changed to scroll code data obtained by depression of the scroll key 37. And then the operation proceeds to step 2811.

Meanwhile in step 2810, the scroll code data stored in the memory area of the RAM 4 correspondingly to one designated pattern is changed to the scroll code data obtained by depression of the scroll key 37. And the operation proceeds to step 2811.

In step 2811, a decision is made as to whether the execute key 33 for example has been depressed or not. And the operation is terminated if the result of such decision is "YES", or to step 2801 again.

Figure 5B:
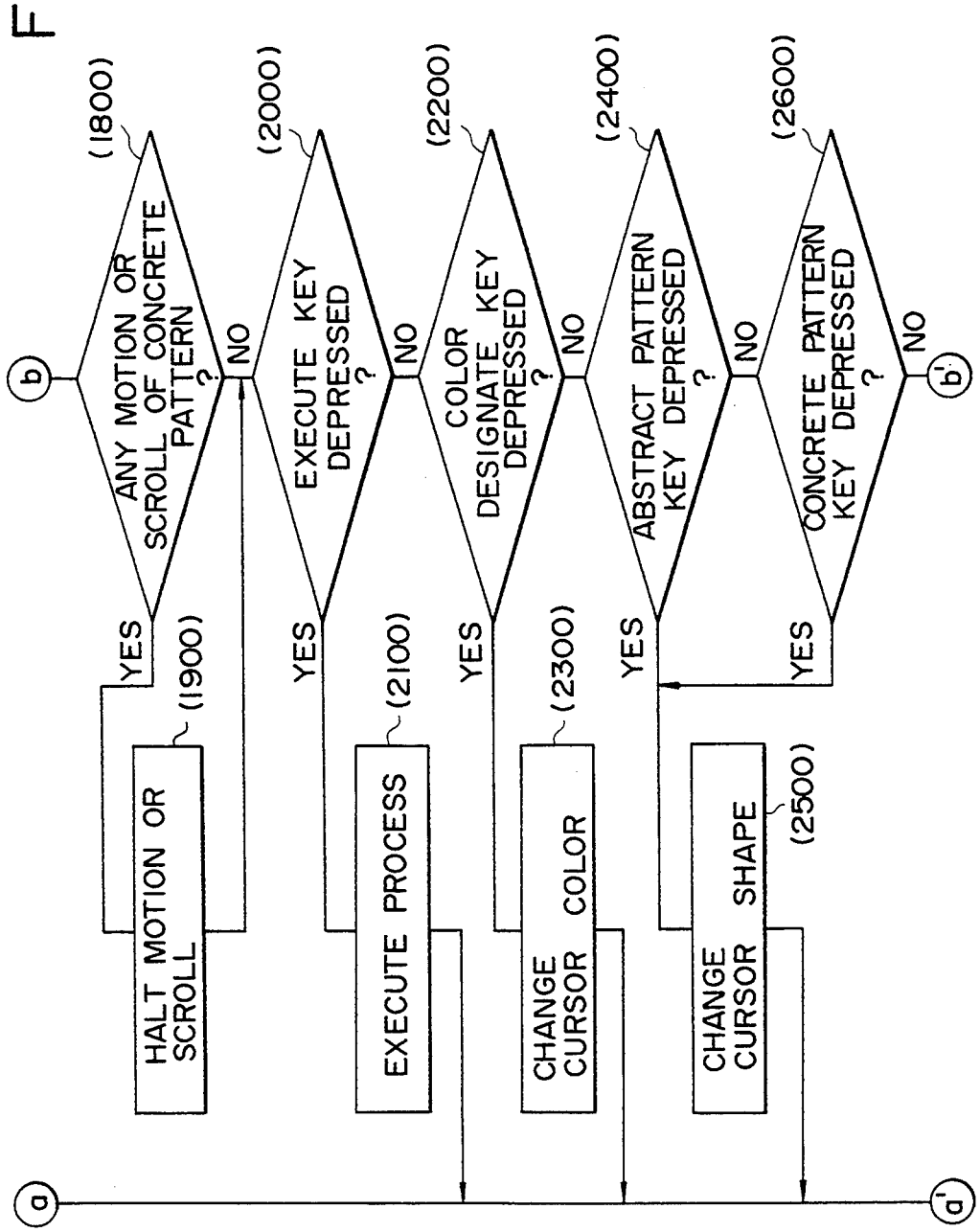
Figure 5C:
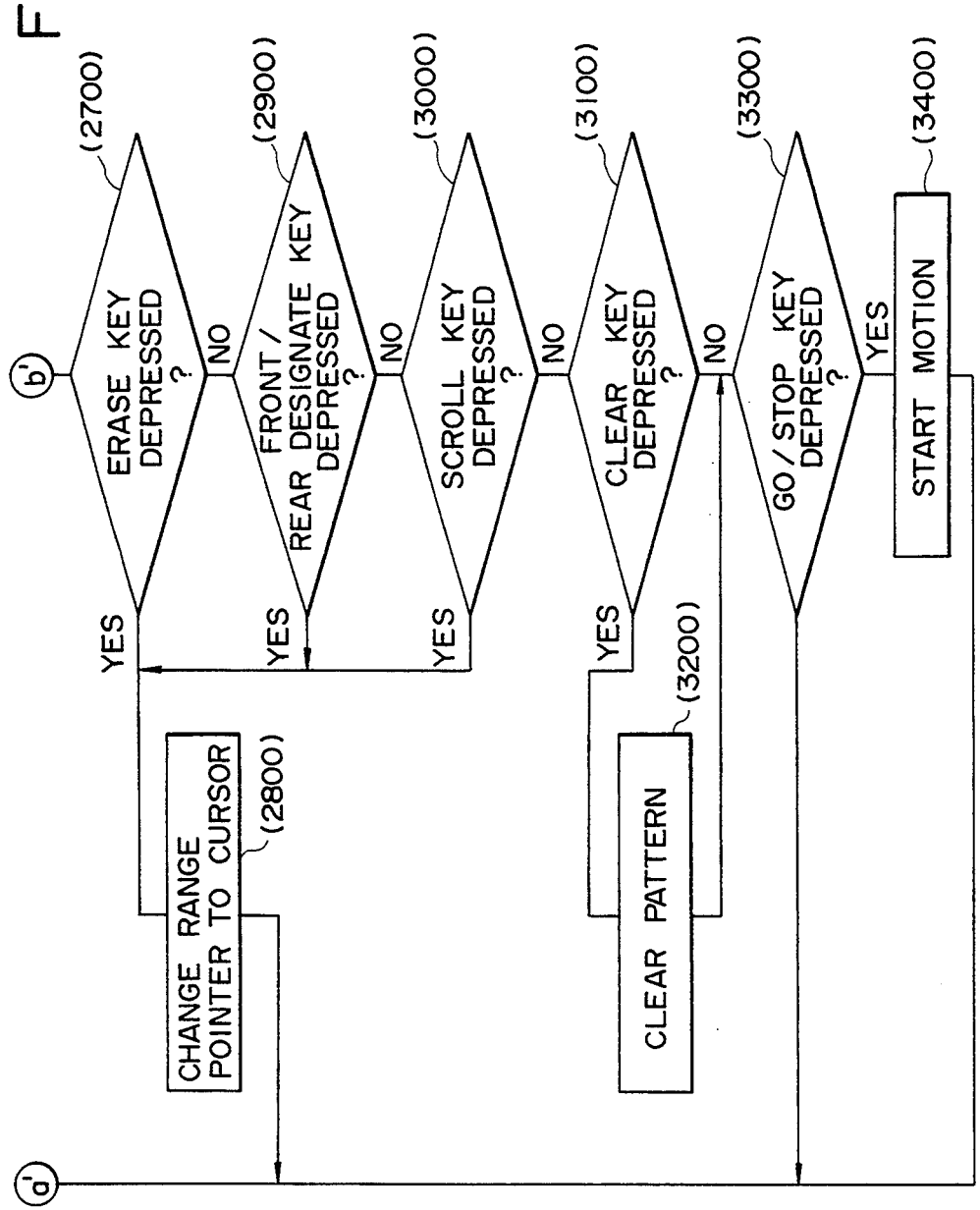

After completion of designating the scroll direction and the pattern or the pattern aggregate to be scrolled as described above, the go/stop key 36 is depressed in step 3300 in the aforementioned flow chart of FIG. 5 for scrolling the designated pattern or pattern aggregate. When the go/stop key 36 is depressed in the step 3300 in this flow chart, the operation proceeds to step 3400 for starting the scroll. Now the routine for executing such scroll will be described below with reference to a flow chart of FIG. 8.

First in step 3300, a decision is made as to whether the go/stop key 36 has been depressed or not. And the operation proceeds to step 3401 if the result of such decision is "YES", or to step 3300 again in case the result is "NO".

In step 3401, the desired scroll is executed in accordance with the designated scroll code data. More specifically, the positions X, Y of the individual patterns in the memory areas (e.g., from 1 to 100) of FIG. 4 are sequentially rewritten in accordance with the scroll code data stored in the memory areas, and then the video data are written sequentially in the RAM 6 in accordance with the individual data in the memory areas where the rewritten positions X, Y are stored. And the operation proceeds to step 3402.

In step 3402, a decision is made as to whether any of the key switches 30 or the sheet switches 20 has been depressed or not. And the operation proceeds to step 3403 if the result of such decision is "YES", or to step 3402 again in case the result is "NO".

In step 3403, writing the video data in the RAM 6 in step 3401 is interrupted if any of the key switches 30 or the sheet switches 20 is in the depressed state, whereby the video data written last in the RAM 6 is read out therefrom repeatedly by the video processor 5 so that a motionless still video image is displayed on the monitor screen, and thus the operation is terminated.

Figure 11A:
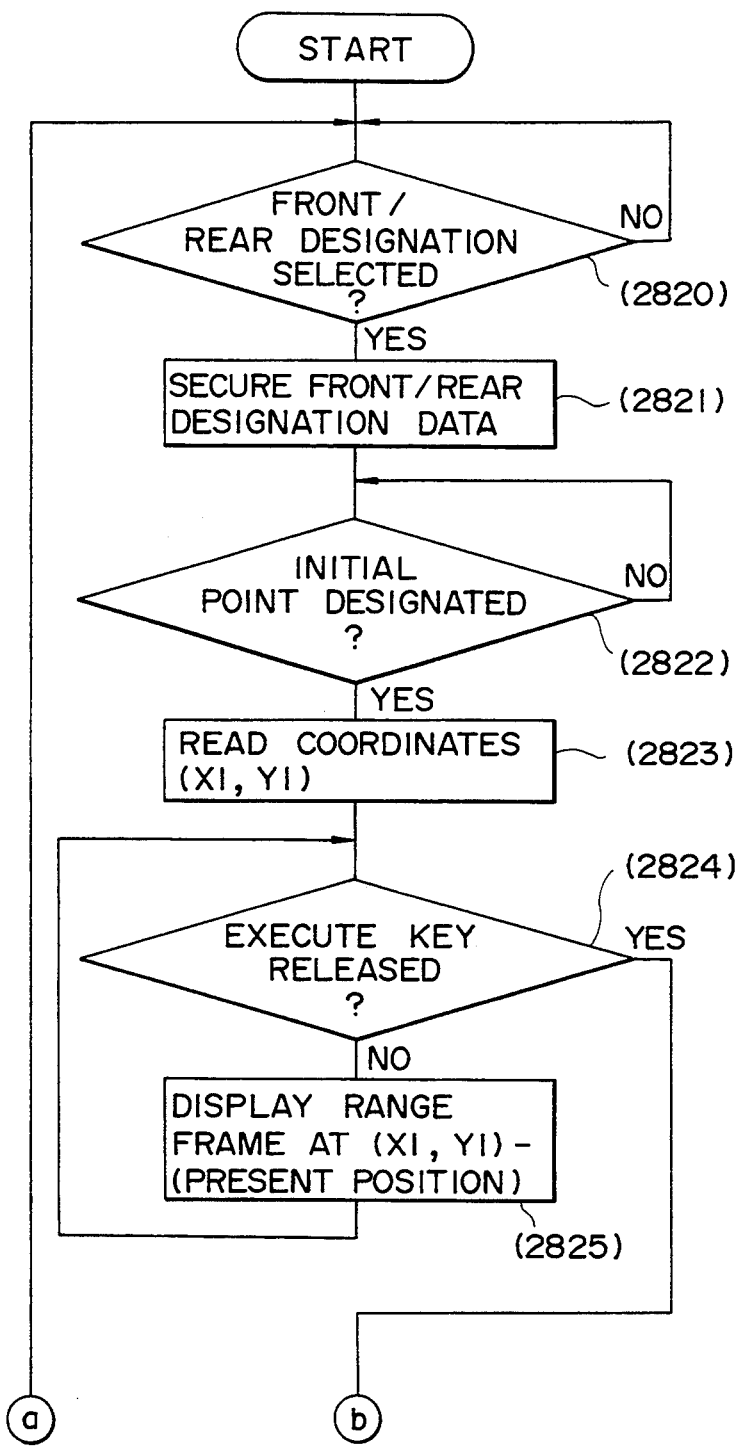
FIGS. 11 and 11A–11B are flow charts of the operation performed to designate the front and rear positional relation of pictures at the time of scroll in the animation drawing apparatus of the present invention.
Figure 11:
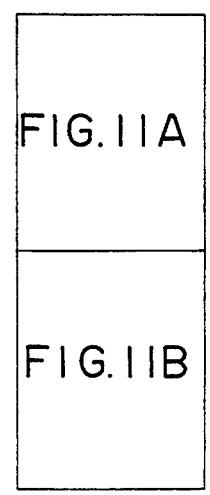
Figure 11B:
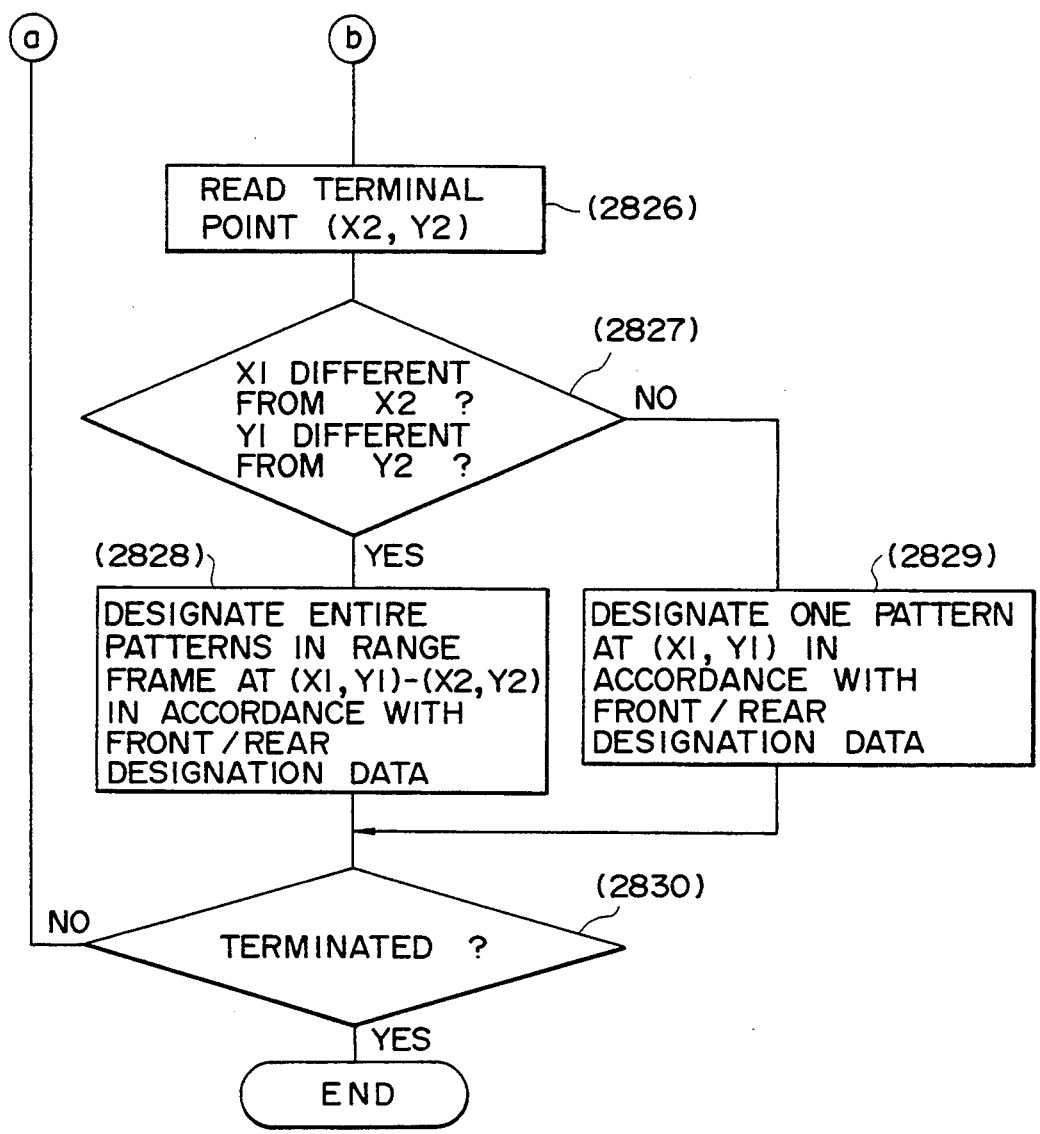

In the scroll mode mentioned, there occurs an occasion where the pattern or the pattern aggregate scrolled on the screen by the above-described operation is superimposed on the other pattern or pattern aggregate. In such a case, it is possible to designate the display priority previously to determine which of the superimposed patterns or pattern aggregates is to be first displayed with priority on the screen. More specifically, when the front/rear designate key 34f or 34r is depressed in step 2900 shown in the flow chart of FIG. 5, the operation proceeds to step 2800. In this step, the cursor is changed to the range pointer P, then the pattern or the pattern aggregate to be designated with respect to the front-/rear positional relation on the screen is designated by the range pointer P, and subsequently the scroll process is executed. Hereinafter, designation of the front/rear positional relation by the aforementioned range pointer P will be described with reference to a flow chart of FIG. 11.

First in step 2801, a decision is made as to whether the front/rear priority designation has been selected or not. And the operation proceeds to step 2821 if the result of such decision is "YES", or to step 2820 again in case the result is "NO".

In step 2821, the front/rear designate data is secured. More specifically, the front/rear designate data obtained from the depressed front/rear designate key 34f or 34r is stored in the RAM 4. And the operation proceeds to step 2822.

In step 2822, a decision is made as to whether the initial point has been designated or not. And the operation proceeds to step 2823 if the result of such decision is "YES", or to step 2822 again in case the result is "NO". Such designation of the initial point is performed by first shifting the range pointer P, which is used as a cursor as illustrated in FIG. 9A or 10A, by means of the joystick 10 to a suitable position in the upper left region of the pattern or the pattern aggregate to be scrolled, and then depressing the execute key 33. The position (X1, Y1) at the instant of depressing the execute key 33 is determined to be the initial point.

In step 2823, the position (X1, Y1) is read. The initial point (X1, Y1) is derived from the digital position signal obtained by actuating the joystick 10, and then is stored in the RAM 4. Thereafter the operation proceeds to step 2824.

In step 2824, a decision is made as to whether the execute key 33 has been released or not. And the operation proceeds to step 2826 if the result of such decision is "YES", or to step 2825 in case the result is "NO".

In step 2825, the range frame 102 is displayed on the monitor screen as illustrated in FIG. 9A or 10A. Such display of the range frame 102 is performed by first shifting the range pointer P to the initial point (X1, Y1) by means of the joystick 10 and, while continuously depressing the execute key 33, further shifting the range pointer P by the joystick 10 to a suitable position in the lower right region of the pattern or the pattern aggregate which is to be designated with respect to the front-/rear positional relation, as illustrated in FIG. 9A or 10A. The frame 102 signifies that the pattern or the pattern aggregate enclosed with such frame is designated with respect to the front/rear positional relation.

In step 2807, the terminal point is read. The range pointer P is shifted on the monitor screen by the joystick 10 as illustrated in FIG. 9A or 10A while the execute key 33 is held continuously in the depressed state thereof, and after the pattern or the pattern aggregate to be designated with respect to the front/rear positional relation (the boy 101 in FIG. 9A or 10A) is enclosed with the range frame 102, the execute key 33 is released at the terminal point (X2, Y2). The position data (X2, Y2) of the range pointer P used as a cursor on the screen at the instant of release of the execute key 33 is stored in the RAM 4. And the operation proceeds to step 2827.

In step 2827, a decision is made as to whether the value X1 of the initial point is different or not from the value X2 of the terminal point and also whether the value Y1 of the initial point is different or not from the value Y2 of the terminal point. And the operation proceeds to step 2828 if the result of such decision is "YES", or to step 2829 in case the result is "NO".

In step 2828, there is written, in the lower or upper memory area shown in FIG. 4, the designated range from the initial point (X1, Y1) to the terminal point (X2, Y2), i.e., the entire data (the boy 101 in this example) in the memory areas of the RAM 4 in FIG. 4 (corresponding to the address range in the RAM 4) where the pattern designated by the range frame 102 as illustrated in FIG. 9A or 10A is stored. The sequence of writing the pattern data in the memory areas of the RAM 6 is downward from the top as shown in FIG. 4 (e.g., from the smallest-address memory area to the greatest-address memory area of the RAM 4). Consequently, when the designated pattern or pattern aggregate is to be displayed at a visually front position on the screen in comparison with the other pattern or pattern aggregate, the former pattern or pattern aggregate is written in the lower memory area. Meanwhile, when the positional relation therebetween is inverse, the former pattern or pattern aggregate is written in the upper memory area. Thereafter the operation proceeds to step 2829.

In step 2829, the pattern data in the memory area of the RAM 4 corresponding to one designated pattern is written in the lower or upper memory area in FIG. 4 similarly to the foregoing process. And the operation proceeds to step 2830.

In step 2830, a decision is made as to whether the execute key 33 has been depressed or not. And the operation is terminated if the result of such decision is "YES", or to step 2820 again in case the result is "NO".

Figure 9B:
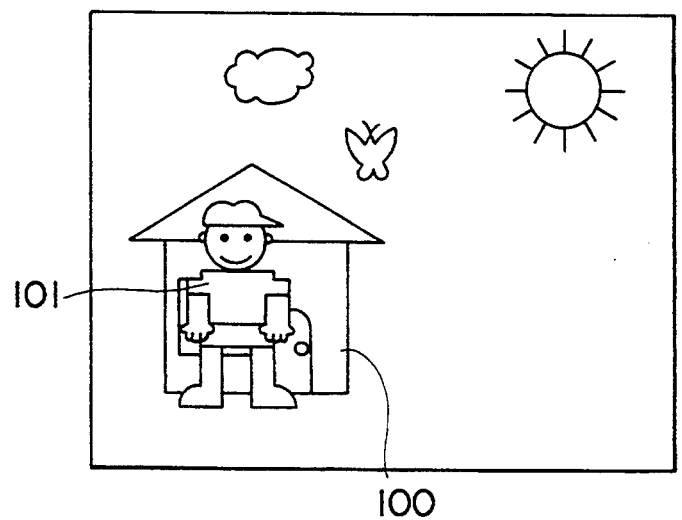
Figure 10B:
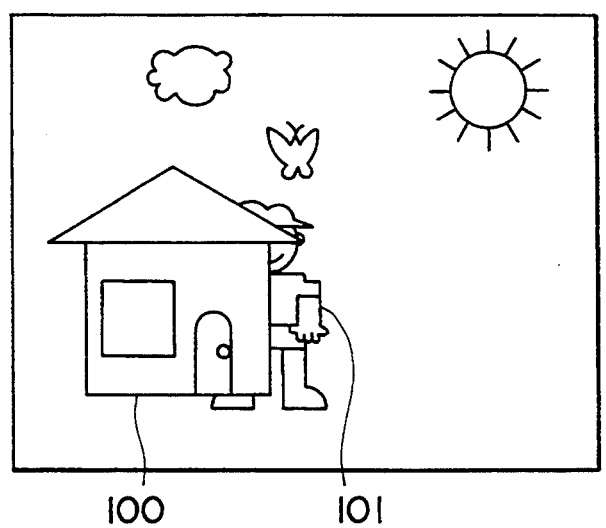

The scroll is started by depressing the go/stop key 36 subsequently to designation of the front/rear positional relation as mentioned. When the boy 101 is designated as illustrated in FIG. 9A after depression of the front-/rear designate key 34f, the boy 101 is so scrolled as to be displayed in front of the house 100 as illustrated in FIG. 9B. Meanwhile, if the boy 101 is designated as illustrated in FIG. 10A after depression of the front-/rear designate key 34r, the boy 101 is so scrolled as to be displayed behind the house 100 as illustrated in FIG. 10B. Therefore, despite that the display is on a two-dimensional plane, it becomes possible to achieve an effect of displaying the patterns with a visual depth, hence attaining an enhanced expressive display.

In the above embodiment, a description has been given with regard to an exemplary case where the front-/rear positional relation is selectively determined between the designated pattern or pattern aggregate and the other non-designated one on the screen. In addition thereto, it is also possible in the invention to modify the designation by establishing a priority order among three or more patterns or pattern aggregates to determine the front/rear positional relation for the designated ones. Besides the above example described with regard to the motion and the scroll direction selected by the scroll key 37 shown in FIGS. 2 and 3, it is further possible to realize a variety of display states where, for example, any pattern or pattern aggregate is held at a halt for a predetermined time after being scrolled for a fixed time, or is displayed or erased randomly on the screen. It will be understood with facility that the designation of such front/rear positional relation is attainable also by the combination of an AND circuit, an OR circuit and an inverter at the writing in the RAM 6.

It is a matter of course that the present invention is not limited to the above embodiment alone and may be contrived to have any of various adequate constitutions without departing from the inventive spirit thereof.

According to the present invention described hereinabove, the scroll direction can be designated with respect to each of individual characters displayed on the screen of a monitor, so that there are attainable superior advantages including that an expressive motion can be given to any picture drawn on the screen to consequently ensure remarkable visual effects and pleasure for the user.

Further according to the present invention, the front and rear positional relation between the displayed characters can be designated in a scroll mode, whereby the pictures produced on the screen are so processed as to have a visual depth in addition to the expressive motion with the visual effects and pleasure offered to the user.

What is claimed is:

1. An animation image constructing apparatus for constructing animated pictures on a screen of a display unit, comprising:
   operating means for moving a cursor on the screen;
   first memory means for storing data corresponding to character patterns and for reading out the character patterns;
   character pattern selecting means, including user operated keys, for selecting a predetermined character pattern from among a plurality of character patterns stored in the first memory means for display on the screen, the plurality of patterns including geometric patterns and semirealistic patterns;
   second memory means for storing display data which is displayed on the screen;
   executing means for fixing the position of the predetermined character in the second memory means so as to display the predetermined character on the screen at a position of the cursor as designated by the user operating the operating means;
   character designating means for selectively designating a desired character of the characters displayed on the screen;
   key switch means for designating predetermined scroll direction pattern data for scrolling the designated character in a predetermined direction pattern;
   execution command means, including a start key and a stop key, for generating an execution command when the start key is operated, wherein, in response to the execution command, the designated character is automatically scrolled and displayed in accordance with the scroll direction pattern data obtained from the scroll direction designating means until the stop key is operated while one or more of the remaining characters displayed on the display screen remain motionless; and
   priority means for designating the priority order between a plurality of characters drawn on the screen, wherein, when the characters being displayed are scrolled to be mutually superimposed, one of such characters is displayed by priority in conformity to the priority order designated by the priority means.

2. The animation image constructing apparatus according to claim 1, wherein the character designating means comprises a range pointer displayed on the screen, and the character is indicated by the pointer.

3. The animation drawing apparatus according to claim 2, wherein, when two predetermined points on the screen are designated by the range pointer displayed on the screen, a frame having corners at the two points is displayed by the designating means.

4. The animation image constructing apparatus according to claim 1, wherein the character designating means includes a joystick.

5. The animation image constructing apparatus according to claim 1, wherein execution command means causes the designated character to scroll at a predetermined rate in response to operation of the start key.

6. The animation image constructing apparatus according to claim 1, further comprising a housing for housing in a single casing the operating means, the character pattern selecting means, the second memory means, the executing means, the character designating means, the key switch means, the execution command means, and the priority means.

7. The animation image constructing apparatus according to claim 1, wherein the display unit is a television monitor and the executing means outputs animated pictures to the display unit in the form of a formatted television signal.

8. A child's animation computer for constructing pictures to be displayed on a display screen and animating the pictures, the animation computer comprising:

means for selecting from among a plurality of geometric patterns and semirealistic patterns to be displayed on the display screen, wherein the geometric patterns can be arranged on the display screen to form realistic figures, and further including a plurality of user operated pattern key switches each bearing an image of the pattern to be displayed;

cursor means for causing a cursor displayed on the display screen to be moved under control of the user, the cursor means including a user operated cursor control and further designating a pattern displayed on the display screen whose position is to be changed to a new position designated by the cursor;

means for assigning one of a plurality of relative movement patterns, including curvilinear movement patterns, to one or more of the patterns displayed on the display screen, the means for assigning movement including a plurality of user operated movement key switches each bearing a depiction of a different movement pattern;

priority means for designating the priority order between a plurality of characters drawn on the screen, wherein, when the characters being displayed are moved to be mutually superimposed, one of such characters is displayed by priority in conformity to the priority order designated by the priority means, the priority means including a user operated priority switch;

erase means for erasing one or more of the displayed character patterns in response to a user designation of the displayed character patterns to be erased by use of the cursor means, the erase means further including a user operated erase switch;

a movement start switch, which when activated by the user, causes each displayed pattern for which the user has assigned a movement pattern using the assigning means to begin movement relative to one or more other displayed patterns, and a stop switch, which when activated by the user, stops movement of the displayed characters; and a control board upon which the pattern key switches, the user operated cursor control, the movement key switches, priority switch, the erase switch, the start switch, and the stop switch are mounted.

9. A child's animation computer as defined in claim 8 wherein the display screen is a screen of a television set connected to the animation computer.

10. A child's animation computer as defined in claim 9 further comprising user operated color palette keys on the control board for assigning different colors to the displayed patterns.

* * * * *